ent Apr. 21, 1964

3,130,169
STABILIZATION OF PEROXY CARBOXYLIC ACIDS

John H. Blumbergs, Highland Park, and Harold K. Latourette, Pennington, N.J., assignors to FMC Corporation, a corporation of Delaware
No Drawing. Filed June 26, 1961, Ser. No. 119,325
9 Claims. (Cl. 252—186)

The present invention relates to a process for stabilizing organic solutions of peroxycarboxylic acids.

It is known that peroxycarboxylic acids are excellent oxidizers and have great utility in epoxidizing olefinic compounds. These acids are especially valuable for the epoxidation of non-volatile, water-insoluble, unsaturated compounds which cannot be converted to oxirane compounds by direct oxidation with oxygen. A description of their use in epoxidation reactions is given in Swern's article from "Chemical Reviews," volume 45, August 1949, at pages 1–68.

Organic solutions of peroxycarboxylic acids are desirable for supplying oxygen in various organic oxidations, e.g., epoxidation reactions, because various peroxycarboxylic acids have higher oxidation potentials, and are more selective than the lower aliphatic peroxycarboxylic acids, such as peroxyacetic acid. Despite this, the only peroxycarboxylic acid which is extensively used in commercial practice is peroxyacetic acid. Other peroxycarboxylic acids have not been used, despite their obvious advantages, because they could not be supplied in stable organic solutions. The rapid decomposition rate of organic solutions of these peroxycarboxylic acids precludes maintaining any supply of organic peroxycarboxylic acid solutions not intended for immediate use. The decomposition takes place according to the following equation:

(I) 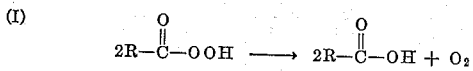

$$2R-\overset{O}{\underset{\|}{C}}-OOH \longrightarrow 2R-\overset{O}{\underset{\|}{C}}-OH + O_2$$

Organic solutions of peroxycarboxylic acids are desirable since almost all of the peroxycarboxylic acids are relatively water insoluble except for a few lower aliphatic peroxycarboxylic acids such as peroxyformic acid and peroxyacetic acid. The higher aliphatic peroxycarboxylic acids are relatively water insoluble. As a result of the instability of organic solutions of peroxycarboxylic acids, these solutions are made up just prior to being used in chemical reactions such as epoxidations.

The extent of this decomposition can be readily appreciated when it is found that a 21% solution of peroxybenzoic acid in benzene which was stored at room temperature for 34 days, showed a loss of over 91% of its active oxygen. Decomposition at this rate cannot be tolerated where immediate use of the chemical is not contemplated. As a result of this serious, continuous decomposition, there has been an urgent need for some means of preparing organic solutions of peroxycarboxylic acids whose storage stability is within acceptable limits, without material loss of their active-oxygen content.

It is an object of the present invention to prepare compositions of peroxycarboxylic acids in organic solvents which are stable against loss of active oxygen.

It is a further object of the present invention to teach a process for producing compositions of peroxycarboxylic acids in organic solvent mixtures which are stable against loss of active oxygen.

It has now been found, unexpectedly, that peroxycarboxylic acids which do not contain oxidizable groups can be stabilized against decomposition by employing a saturated aliphatic tertiary alcohol as a solvent for the peroxycarboxylic acid. The selected saturated aliphatic tertiary alcohol should be free of non-complexed heavy metals and should dissolve enough of the peroxycarboxylic acid to make up the desired concentration of the acid. The saturated aliphatic tertiary alcohol can be employed alone, or as the major ingredient in a solvent mixture containing minor amounts of other inert organic solvents.

The tertiary alcohols which are suitable for stabilizing peroxycarboxylic acids must be free of oxidizable groups which can react with these acids. For this reason, oxidizable functional groups including unsaturated hydrocarbon and non-hydrocarbon groups cannot be present on the tertiary alcohol. The aliphatic chains of the tertiary alcohol can be branched or straight chained and can be of different lengths.

The length of the aliphatic chain does not affect the stabilizing effect of the tertiary alcohol on peroxycarboxylic acids. However, as the number of carbon atoms in the chains increases, the molecular weight of the tertiary alcohol also increases. Further, as the molecular weight of the tertiary alcohol increases, the solubility of the peroxycarboxylic acid in the alcohol may, depending upon the specific peroxycarboxylic acid employed, decrease. Accordingly, the size of the alkyl groups in the tertiary alcohols which can be employed is limited only by the amount of peroxycarboxylic acid which is to be dissolved in the tertiary alcohol solvent.

The preferred members of the group of tertiary alcohols are tert-butyl alcohol and tert-amyl alcohol. These alcohols are relatively inexpensive and possess high solvent powers for most peroxycarboxylic acids.

Impurities in the tertiary alcohol may cause decomposition of the peroxycarboxylic acid solutions as in Equation I, or may be oxidized by the peroxycarboxylic acids, thus wastefully consuming them. The offending impurities generally are heavy metals, primary and secondary alcohols and olefins.

Heavy metals initiate catalytic decomposition of the peroxycarboxylic acid, and therefore, are highly undesirable, even in small amounts. Two methods can be employed to eliminate decomposition. The first of these is to remove the heavy metals by distilling the tertiary alcohol in glass or glass-lined equipment. Another is to render the heavy metals inactive by adding a small amount, on the order of about 100 p.p.m., of a metal chelating agent.

A compound such as dipicolinic acid is an ideal chelating agent, and effectively ties up the heavy metal in a complex organic structure, thereby making it unavailable for initiating decomposition of the peroxycarboxylic acid. While a metal chelating agent such as dipicolinic acid is effective when used with the tertiary alcohols of the present invention, these chelating agents do not have any stabilizing effect with non-polar organic solvents, e.g., benzene, n-heptane, chloroform, diethyl ether, etc. Therefore, the benefits of the present invention cannot be obtained by the use of chelating agents with solvents other than tertiary alcohols.

The primary and secondary alcohols are undesirable impurities because they interact with the peroxycarboxylic acid to yield carboxylic acids and ketones respectively, thereby contributing to the decomposition of the peroxycarboxylic acid. Olefinic impurities are offensive because they react with the peroxycarboxylic acid to form epoxy and carboxy derivatives. Ketone, aldehyde, and amine impurities should also be avoided as these react with the peroxycarboxylic acid.

The present tertiary alcohols can be used alone or in admixture with minor amounts of organic solvents which do not have oxidizable substituents. Minor amounts or organic solvents such as benzene, and n-heptane have been found quite suitable. The amount of tertiary alcohol in the solvent mixture which is required to maintain the stabilizing action varies with the specific tertiary alcohol and the added solvent. However, it has been found that upwards of about 80% of the presently described tertiary alcohol is generally required to assure obtaining the full stabilizing effect.

The peroxycarboxylic acids which can be stabilized by the present class of organic solvents include aromatic peroxy-carboxylic acids, branched or straight chain saturated aliphatic peroxycarboxylic acids, and saturated cycloaliphatic peroxycarboxylic acids. These peroxycarboxylic acids can be substituted or unsubstituted, provided that the substituent groups are those which are not oxidized by peroxycarboxylic acids. Groups which are oxidizable, and therefore unsuitable, include primary and secondary alcohols, phenols, ketones, aldehydes and amines. Non-oxidizable groups, e.g., nitro, tertiary hydroxy, and fluoro substituents are acceptable.

Among the aromatic peroxycarboxylic acids which can be stabilized by the present solvents are peroxybenzoic acid, as well as the substituted aromatic peroxycarboxylic acids such as ortho-chloroperoxybenzoic acid, para-chloroperoxybenzoic acid, para-nitroperoxybenzoic acid, and others containing similar non-oxidizable substituents.

Aliphatic peroxycarboxylic acids which can be stabilized by the present class of tertiary alcohols include straight chained compounds such as peroxyacetic acid, peroxybutyric acid, peroxypropionic acid, peroxylauric acid, as well as substituted aliphatic peroxycarboxylic acids such as monochloroperoxyacetic acid. Among the branched chained members of this group which can be employed are peroxy isobutyric acid, 2,2,4,4-tetramethyl peroxypentanoic acid, 3,5,5 - trimethylperoxyhexanoic acid, 2-methyl, 2,3-dichloroperoxypropionic acid, and trifluoroperoxyacetic acid.

The cycloaliphatic peroxycarboxylic acids can be stabilized in the same manner as the acyclic members of this class. Among the acids which are suitable are peroxycyclohexanoic acid, peroxydecalincarboxylic acid and other substituted and nonsubstituted cycloaliphatic peroxycarboxylic acids.

The following examples illustrate the stabilizing effect of the specified tertiary alcohols and are presented as representative of the present invention, but are not intended as limitative thereof.

EXAMPLE 1

Solid peroxybenzoic acid was dissolved in various organic solvents as shown in Table I. The solutions were analyzed for their active-oxygen content by titration with 0.1 N $Na_2S_2O_3$ solution in the presence of acetic acid. The solutions were placed in bottles in a dark place and stored at room temperature for a period of time. Then they were analyzed for the remaining peroxybenzoic acid content after storage. The stability of the solution was found by determining the losses of active oxygen during the storage period and calculating the amount of oxygen lost as percent loss. The results are presented in Table I.

The data show that peroxybenzoic acid dissolved in tert-butyl alcohol lost only 0.8% to 2.0% of its active oxygen after three weeks storage at room temperature, while solutions in other organic solvents lost 25% to 99%.

EXAMPLE 2

Peroxybenzoic acid solutions in various organic solvents were prepared the same way as described by Example 1. Dipicolinic acid was added to each solution. In tert-butyl alcohol only 50 p.p.m. could be added because of limited solubility. In other solvents 200 p.p.m. was added. The stability of these solutions was tested after the reported time intervals in the manner of Example 1. The results obtained are reported in Table II.

As seen in Table II, the peroxybenzoic acid in tert-butyl alcohol lost only 0.7% to 1.2% per month of its active oxygen, compared with solutions in other organic solvents where 17% to 99% were lost.

EXAMPLE 3

Peroxybenzoic acid was dissolved in a mixed solvent containing tert-butyl alcohol. To some of these solutions dipicolinic acid was added. The samples were stored at room temperature and the storage stability was determined the same way as described in Example 1. The results are shown in Table III.

The data show that peroxybenzoic acid solutions in mixed solvents containing tert-butanol and dipicolinic acid lost only 0.5% to 1.0% of its active oxygen after storage for one month at room temperature.

EXAMPLE 4

Solid peroxybenzoic acid was dissolved in tert-butyl alcohol and was stored at the various temperatures and concentrations given in Table IV. Additionally, other solvents were employed to make up solutions of peroxybenzoic acid. The solutions, additives, and active-oxygen losses are given in Table IV. The storage stability was determined using the same procedure as Example 1.

The results, reported in Table IV, show that peroxybenzoic acid solutions in tert-butanol did not lose any active oxygen when stored for two months at 14° C. or below. The same solution when stored at 25° C. lost only 1.57% of its active oxygen. When peroxybenzoic acid was dissolved in chloroform, or chloroform-chlorobenzene mixture, the solutions lost 15% to 20% of their active oxygen after one month's storage at +4° C. and 88% after three weeks at room temperature. This solvent, chloroform mixed with benzene, was advised by Kalthoff et al., J. Polymer Sci., 2, 199 (1947), as one of the best solvents for preparation of peroxybenzoic acid solutions.

EXAMPLE 5

A 25.0% by weight solution of peroxybenzoic acid in 3,6-dimethyl-3-octanol was made up which contained 50 p.p.m. of dipicolinic acid. The solution was stored at room temperature (24° to 25° C.) for 30 days. The amount of peroxybenzoic acid was determined at the end of the 30 days in the manner described in Example 1 and was found to have decreased to 24.74%.

EXAMPLE 6

A 15.0% by weight solution by weight solution of peroxybenzoic acid in 1,1-diethyl-1-propanol was made up which contained 50 p.p.m. of dipicolinic acid. The solution was stored at room temperature (24° to 25° C.) for 31 days. The amount of peroxybenzoic acid was determined at the end of the 31 days in the manner described in Example 1 and was found to have decreased to 14.81% by weight.

EXAMPLE 7

Two solutions of peroxybenzoic acid were made up; one contained 28.0% by weight peroxybenzoic acid dissolved in tert-amyl alcohol, the other contained 44.0% by weight peroxybenzoic acid dissolved in tert-butyl alcohol. Each of the solutions contained 50 p.p.m. of dipicolinic acid. The solutions were maintained at room temperature (24° to 25° C.) for 28 days. Thereafter, the solutions were tested in the manner described in Example 1 to determine the amount of peroxybenzoic acid remaining in the solutions; this was found to be 27.69% in the tert-amyl alcohol solution, and 43.51% in the tert-butyl alcohol solution.

EXAMPLE 8

Three solutions were made up by dissolving ortho-chloroperoxybenzoic acid, para-chloroperoxybenzoic acid and para-nitroperoxybenzoic acid in tertiary butyl alcohol. The concentrations of these solutions are reported in Table V. The samples were stored at room tempertaure for a period of 8 days. At the end of this time, the amount of peroxycarboxylic acid was determined using the same procedure as Example 1. The results are shown in Table V.

EXAMPLE 9

An 18.3% by weight solution of peroxylauric acid in tert-butyl alcohol was made up which contained 50 p.p.m. of dipicolinic acid. The solution was maintained at an elevated temperature of 35° C. for 4 days. The amount of peroxylauric acid was determined at the end of the 4 days in the manner described in Example 1, and this was found to be 18.3%, showing no loss of active oxygen.

EXAMPLE 10

An 18.3% by weight solution of peroxylauric acid in tert-butyl alcohol was made up and maintained at room temperature (24° to 25° C.) for 30 days. The amount of peroxylauric acid was determined at the end of the 30 days in the manner described in Example 1, and was found to be 18.2%.

EXAMPLE 11

A 19.5% by weight solution of peroxybutyric acid in tert-butyl alcohol was made up which contained 50 p.p.m. of dipicolinic acid. The solution was maintained at room temeprature (24° to 25° C.) for 20 days. At the end of this period, the amount of peroxybutyric acid was determined in the manner described in Example 1, and was found to be 19.34%.

EXAMPLE 12

A 12.30% by weight solution of peroxycyclohexanoic acid in tert-butyl alcohol was made up which contained 50 p.p.m. of dipicolinic acid. The solution was maintained at room temperature (24° to 25° C.) for 30 days. At the end of this period, the amount of peroxycyclohexanoic acid was determined in the manner described in Example 1, and was found to be 12.16%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

*Table I*

| Solvent Used | Perbenzoic acid conc.[1] before storage, wt. percent | Perbenzoic acid concentration[1] after storage[2] | | | | | |
|---|---|---|---|---|---|---|---|
| | | 1 | | | 2 | | |
| | | Stor. time, days | Conc., wt. percent | Percent losses | Stor. time, days | Conc., wt. percent | Percent losses |
| Tert-butyl alcohol | 5.38 | 13 | 5.34 | 0.8 | 22 | 5.34 | 0.8 |
| Do | 25.5 | 14 | 24.9 | 2.34 | 28 | 25.0 | 1.95 |
| Benzene | 9.04 | 10 | 7.55 | 16.5 | 20 | 6.52 | 27.8 |
| Diethyl ether | 13.25 | 10 | 6.82 | 48.5 | 20 | 2.95 | 77.7 |
| Benzene, 90%+n-heptane, 10% | 9.40 | 14 | 7.90 | 15.8 | 23 | 7.05 | 25.0 |
| Chloroform | 6.90 | 15 | 0.95 | 86.3 | 31 | 0.01 | 99.9 |
| Chlorobenzene | 33.3 | 7 | 23.7 | 28.8 | | | |
| Dioctylphthalate | 35.5 | 10 | 32.05 | 9.7 | 28 | 26.5 | 25.3 |
| n-Butyl alcohol | 8.62 | 13 | 3.09 | 63.0 | 22 | 1.46 | 83.0 |
| Sec-butyl alcohol | 7.25 | 13 | 0.82 | 88.5 | 22 | 0.07 | 99.0 |
| Iso-butyl alcohol | 9.72 | 13 | 3.88 | 60.0 | 22 | 2.19 | 77.5 |
| Iso-propyl alcohol | 9.33 | 13 | 1.87 | 80.0 | 22 | 0.88 | 90.5 |
| Acetic acid | 5.58 | 13 | 3.15 | 43.5 | 22 | 2.32 | 58.3 |

[1] By active oxygen determination.
[2] Storage at 24° to 25°C.

*Table II*

| Solvent Used | DPA[2] added, p.p.m. | Conc. before storage, wt. percent | Analyses results after storage[1] | | | | | | | | |
|---|---|---|---|---|---|---|---|---|---|---|---|
| | | | 1 | | | 2 | | | 3 | | |
| | | | Stor. time, days | Conc., wt. percent | Percent losses | Stor. time, days | Conc., wt. percent | Percent losses | Stor. time, days | Conc., wt. percent | Percent losses |
| Tert-butyl alcohol | 50 | 25.5 | 14 | 25.4 | 0.4 | 28 | 25.3 | 0.78 | 58 | 25.1 | 1.57 |
| Do | 50 | 40.0 | 7 | 39.7 | 0.75 | 21 | 39.5 | 1.25 | | | |
| Do | 50 | 40.2 | 14 | 40.4 | 0 | 27 | 39.7 | 1.2 | | | |
| Benzene | 200 | 9.04 | 10 | 7.55 | 16.5 | 20 | 6.52 | 27.8 | | | |
| Benzene, 90%+n-heptane 10% | 200 | 9.40 | 14 | 7.90 | 15.8 | 23 | 7.05 | 25.0 | | | |
| Chloroform | 200 | 6.90 | 15 | 0.95 | 86.3 | 31 | 0.01 | 99.9 | | | |
| Chloroform 90%+chlorobenzene 10% | 200 | 5.82 | 6 | 3.64 | 36.3 | 22 | 0.70 | 88.0 | | | |
| Dioctylphthalate | 200 | 35.5 | 10 | 34.1 | 4.0 | 38 | 2.95 | 17.0 | | | |
| Chlorobenzene | 200 | 33.3 | 7 | 31.5 | 5.4 | | | | 180 | 6.80 | 80.2 |

[1] Storage was at 24° to 25° C.
[2] Dipicolinic acid.

Table III

| Solvent Used | DPA[2] added, p.p.m. | Conc. before storage, wt. percent | Analyses results after storage[1] | | | | | | | | |
|---|---|---|---|---|---|---|---|---|---|---|---|
| | | | 1 | | | 2 | | | 3 | | |
| | | | Stor. time, days | Conc., wt. percent | Percent losses | Stor. time, days | Conc., wt. percent | Percent losses | Stor. time, days | Conc., wt. percent | Percent losses |
| Tert-butanol, 85%; benzene, 10%; n-heptane, 5% | 0 | 40.7 | 7 | 40.4 | 0.74 | 14 | 39.7 | 2.46 | 28 | 39.1 | 3.90 |
| Do | 100 | 40.7 | 7 | 40.7 | 0 | 14 | 40.5 | 0.49 | 28 | 40.4 | 0.74 |
| Tert-butanol, 85%; benzene, 15% | 100 | 40.2 | | | | | | | 27 | 40.0 | 0.5 |
| Tert-butanol n-heptane, 15% | 100 | 40.4 | | | | | | | 27 | 40.0 | 1.0 |

[1] Storage was at 24° to 25° C.
[2] Dipicolinic acid.

Table IV

| Solvent Used | DPA added, p.p.m. | Conc. before storage, wt. percent | Stor. time days | Stor. temp., °C. | Conc. wt. percent after storage | Percent losses |
|---|---|---|---|---|---|---|
| Tert.=butyl alcohol | 0 | 25.5 | 58 | 4 | 25.5 | 0 |
| Do | 50 | 25.5 | 58 | 4 | 25.5 | 0 |
| Do | 0 | 25.5 | 58 | 14 | 25.5 | 0 |
| Do | 50 | 25.5 | 58 | 14 | 25.5 | 0 |
| Do | 50 | 25.5 | 58 | 25 | 25.1 | 1.57 |
| Washed chloroform | 0 | 6.58 | 35 | 4 | 5.31 | 19.4 |
| Do | 200 | 6.58 | 35 | 4 | 5.34 | 18.8 |
| Washed chloroform 90% + chlorobenzene 10% | 0 | 5.82 | 22 | 4 | 4.81 | 17.3 |
| Do | 200 | 5.82 | 22 | 4 | 4.92 | 15.3 |
| Do | 200 | 5.82 | 22 | 25 | 0.70 | 88.0 |

Table V

Analyses After Storage[1]

| Peroxy carboxylic acid | Solvent | DPA[2] added, p.p.m. | Conc. before stor., wt. percent | Stor. time, days | Conc., wt. percent |
|---|---|---|---|---|---|
| Ortho-chloroperoxy benzoic | Tertiary butyl alcohol | 100 | 39.7 | 8 | 39.4 |
| Para-chloroperoxy benzoic | do | 0 | 22.9 | 8 | 22.9 |
| Para-nitroperoxy benzoic | do | 0 | 10.52 | 8 | 10.35 |

[1] Storage was at 24° to 25° C.
[2] Dipicolinic acid.

What is claimed is:

1. A stable composition which consists essentially of a peroxy carboxylic acid, said acid being free of groups which can be oxidized by peroxy carboxylic acids, dissolved in an inert organic solvent containing a saturated aliphatic tertiary alcohol in amounts sufficient to prevent substantial decomposition of said peroxy carboxylic acid, said alcohol being free of oxidizable groups which will react with said acid.

2. The composition of claim 1 which contains dipicolinic acid in amounts up to 200 p.p.m.

3. The composition of claim 1 which contains said saturated aliphatic tertiary alcohol in amounts of at least 80% of a solvent mixture.

4. The composition of claim 1 in which the tertiary alcohol is tert-butyl alcohol.

5. The composition of claim 1 in which the tertiary alcohol is tert-amyl alcohol.

6. A stable composition consisting essentially of peroxy benzoic acid dissolved in an alcohol selected from the group consisting of tert-butyl alcohol and tert-amyl alcohol said alcohol being present in amounts sufficient to stabilize said peroxybenzoic acid against substantial decomposition.

7. The method of stabilizing solutions of peroxy carboxylic acids dissolved in an inert organic solvent, said acids being free of groups which can be oxidized by peroxy carboxylic acids, which comprises adding a saturated aliphatic tertiary alcohol to said solutions of peroxy carboxylic acids in amounts sufficient to stabilize said acids against substantial decomposition, said alcohol being free of oxidizable groups which react with said acids.

8. The method of claim 7 in which the saturated aliphatic tertiary alcohol stabilizer is present in an inert organic solvent mixture in amounts of at least 80%.

9. The method of stabilizing organic solutions of peroxy benzoic acid against substantial decomposition of said acids which comprises adding in stabilizing amounts an alcohol selected from the group consisting of tert-butyl alcohol and tert-amyl alcohol as a stabilizer for said acid.

References Cited in the file of this patent

UNITED STATES PATENTS

| | | |
|---|---|---|
| 1,754,914 | Stoddard | Apr. 15, 1930 |
| 2,169,368 | Murray et al. | Aug. 15, 1939 |
| 2,395,638 | Milas | Feb. 26, 1946 |
| 2,609,391 | Greenspan et al. | Sept. 2, 1952 |